United States Patent [19]

Saeki et al.

[11] 3,897,361

[45] July 29, 1975

[54] PROCESS FOR PRODUCING MICROCAPSULES

[75] Inventors: Keiso Saeki; Hiroharu Matsukawa; Akio Watanabe, all of Fujimiya, Japan

[73] Assignee: Fuji Photo Film Co., Ltd., Minami-Ashigara, Japan

[22] Filed: Sept. 13, 1972

[21] Appl. No.: 288,835

[30] Foreign Application Priority Data

Sept. 13, 1971  Japan................................ 46-71064

[52] U.S. Cl. .............. 252/316; 117/36.2; 117/36.9; 117/62.2; 117/100 A; 252/522
[51] Int. Cl. ...... B01j 13/02; B44d 1/02; B44d 1/44
[58] Field of Search ....... 252/316; 117/100 A, 62.2; 264/4

[56] References Cited
UNITED STATES PATENTS

| | | |
|---|---|---|
| 3,328,257 | 6/1967 | Vrancken et al. ............. 252/316 X |
| 3,432,327 | 3/1969 | Kan et al. ...................... 252/316 X |
| 3,551,346 | 12/1970 | Breen et al. ....................... 252/316 |
| 3,574,132 | 4/1971 | Mosier et al. ...................... 252/316 |
| 3,687,865 | 8/1972 | Katayama et al. ................. 252/316 |

*Primary Examiner*—Richard D. Lovering
*Attorney, Agent, or Firm*—Sughrue, Rothwell, Mion, Zinn & Macpeak

[57] ABSTRACT

In a process for producing microcapsules of a hydrophobic oil solution by complex coacervation of at least two hydrophilic high molecular colloids around droplets of said hydrophobic oil solution, the improvement which comprises adding at least one polyisocyanate compound, polyisothiocyanate compound or a prepolymer thereof to said hydrophobic oil solution is disclosed. Microcapsules of low porosity are produced which have a dense, thick capsule film of high strength.

12 Claims, No Drawings

PROCESS FOR PRODUCING MICROCAPSULES

BACKGROUND OF THE INVENTION

1. Field of the Invention

The present invention relates to a process for producing microcapsules.

In greater detail, the present invention relates to a process for producing microcapsules which comprises modifying a complex coacervate deposited on fine drops of a hydrophobic oil solution to be capsulated by incorporating at least one polyisocyanate compound, polyisothiocyanate compound or prepolymer thereof in the hydrophobic oil solution by which the enclosed matter is protected safely.

2. Description of the Prior Art

The process for microcapsulating a hydrophobic oil solution utilizing complex coacervation is well known to one skilled in the art and referred, for example, to the specification of U.S. Pat. No. 2,800,457. This process is divided into four steps, that is, 1. a step for emulsifying a water incompatible oil in a solution of a hydrophilic colloid (first sol) which is ionized in water (emulsifying step),
2. a step which comprises mixing the emulsified solution of step (1) above with a hydrophilic colloid sol which is ionized in water and has an opposite electrical charge to the colloid of the first sol, and causing coacervation by adding water or by adjusting the pH to cause adhesion of a complex colloid around the oil drops (coacervation step),
3. a step for gelling by cooling the coacervate (gelling step), and
4. a step for adding a hardening agent while adjusting the pH to an alkaline region (preferably a pH of 9 to 11) (prehardening step). This process may be modified optionally. This process is one for covering the hydrophobic oil solution using two kinds of colloid substances having opposite electrical charges to each other, for example, a combination of a colloid substance having a positive charge such as gelatin, casein, albumin and fibrinogen and a colloid substance having a negative charge such as gum arabic, carboxymethyl cellulose and cellulose phthalate and particularly, a combination of gelatin and gum arabic.

However, in this process, the negative electrolyte colloid having a charge opposite to gelatin deposited at step (2) comes out from the equilibrium solution in carrying out the change of the pH at step (4). When the pH is adjusted to the alkaline region, a condition in which more than 90 percent of the negative electrolyte colloid remains in the equilibrium solution occurs and it is impossible to produce capsules having a dense uniform capsule film, that is, the porosity of the capsule film is very high and the capsule film is thin and coarse. Consequently, there is a tendency for the enclosed matter not to be sufficiently protected, because the above matter deteriorates or becomes moist from the influence of the atmosphere, for example, oxygen, carbon dioxide gas and moisture in the air. Further, where the enclosed matter is composed of volatile or evaporable substances, the enclosed matter evaporates easily through the capsule film. Where the enclosed matter has an intense odor, the odor passes through the capsule film. For example, even though a perfume is included therein, it disappears within a very short time.

Accordingly, it is not possible to protect safely the enclosed matter containing chemically unstable substances, volatile substances, hygroscopic substances and other substances from external influences using the above described capsulating process, which is a fatal defect of this process.

An object of the present invention is to provide a process for producing excellent microcapsules having a very low porosity from which the enclosed matter does not exude.

Another object of the present invention is to provide a process for producing microcapsules having a dense thick capsule film having high strength.

The other objects of the present invention will be clear from the description appearing in this specification.

SUMMARY OF THE INVENTION

The above described and another objects of this invention are attained by modifying the complex coacervate deposited on fine drops of the hydrophobic oil solution by adding at least one polyisocyanate compound, polyisothiocyanate compound or prepolymer thereof to a hydrophobic oil solution to be encapsulated and causing complex coacervation.

DETAILED DESCRIPTION OF THE INVENTION

Microcapsulation for covering the hydrophobic oil solution according to this invention can be carried out by complex coacervation induced by adding water and/or by adjusting the pH.

Namely, the formation of the complex coacervate based on a liquid-liquid phase separation is carried out by a treatment for separating a combination of two or more hydrophilic colloids into a colloid rich phase and a colloid poor phase, the so-called complex coacervation. In the complex coacervation, it is indispensable that at least two hydrophilic colloids which have opposite charges from each other are included as the coacervating colloids. At least one of the colloids should be gellable.

Examples of hydrophilic colloids include natural and synthetic substance. For example, there are gelatin, casein, albumin, fibrinogen, alginate, gum arabic, carboxymethylcellulose, cellulose phthalate, carrageenan, styrene-maleic anhydride copolymer and methyl vinylether-maleic anhydride copolymer, etc.

As the substance (hydrophobic oil solution) which becomes a nucleus of each capsule, there are mineral oils, animal oils, synthetic oils and vegetable oils. As mineral oils, examples are, for example, petroleum and distillates thereof such as kerosine, gasoline, naphtha and paraffin oil etc. Examples of animal oils are fish oil and lard oil. Examples of vegetable oils are peanut oil, linseed oil, soybean oil, castor oil and corn oil. Examples of synthetic oils are biphenyl derivatives (e.g., alkyl biphenyl, halogeno-biphenyl), phosphoric acid derivatives, naphthalene derivatives, phthalic acid derivatives and salicylic acid derivatives, etc.

The polyisocyanate compound, the polyisothiocyanate compound or the prepolymer thereof are added to the above described hydrophobic oil solution. These additives can be added directly to the hydrophobic oil solution or can be added to the hydrophobic oil solution as a solution dissolved in an organic solvent. There is no restriction if these additives are added to the hydrophobic oil solution before the emulsifying step. It is preferable to add an anionic, cationic or nonionic surface active agent (refer, for example, to u.S. Pat. Nos.

3,415,649 and 3,201,252) in order to emulsify or disperse the hydrophobic oil solution as the nucleus substance in water because of prevention of inversion, that is, it prevents the formation of a water-in-oil emulsion (w/o emulsion). The oil-in-water emulsion is produced by emulsifying the hydrophobic oil solution as the nucleus substance in at least an aqueous hydrophilic colloid solution as the film forming material.

The emulsion is diluted with water and/or the pH is adjusted, by which the coacervate is deposited around the emulsified oil drops. After coacervation, the coacervate deposited on the surface of the oil drops is solidified by cooling the exterior of the container to gel the capsule film at a temperature lower than about 22° or 23°C, preferably from about 5° to 15°C. Then, in order to harden the capsule film, formaldehyde, for example, is added and the pH of the system is adjusted so that it is alkaline. By warming at a temperature of, for example, from about 30° to 50°C, hardening of the capsule film is accelerated to increase the heat resistance thereof.

As described above, the present invention relates to a process for producing excellent microcapsules, by which loss of the negative electrolyte colloid from the coacervate wall during the pH conversion step is prevented.

The polyisocyanates, polyisothiocyanates and prepolymers thereof which can be used in the process of the present invention covers compounds having at least 2 isocyanate groups or isothiocyanate groups. Examples of these compounds are diisocyanates and diisothiocyanates, such as m-phenylene diisocyanate, p-phenylenediisocyanate, 2,6-tolylenediisocyanate, 2,4-tolvlenediisocyanate, naphthalene-1,4-diisocyanate, diphenylmethane-4,4'-diisocyanate, 3,3'-dimethoxy-4,4'-biphenyldiisocyanate, 3,3'-dimethyldiphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate, cyclohexylene-1,4-diisocyanate, p-phenylenediisothiocyanate, xylylene-1,4-diisothiocyanate and ethylidynediisocyanate; triisocyanates such as 4,4',4''-triphenylmethanetriisocyanate, toluene-2,4,6-triisocyanate and polymethylenepolyphenyl-triisocyanate; tetraisocyanate such as 4,4'-dimethyldiphenyl-methane-2,2',5,5'-tetraisocyanate; polyisocyanate prepolymers such as the addition product of hexamethylenediisocyanate and hexanetriol, the addition product of 2,4-tolylenediisocyanate and catechol, the addition product of tolylenediisocyante and hexanetriol, the addition product of tolylenediisocyanate and trimethylolpropane, the addition product of xylylenediisocyanate and trimethylolpropane and the addition product of hexamethylenediisocyanate and trimethylolpropane; and other polyisocyanates and polyisothiocyanates. Of these compounds, the prepolymers are particularly preferable. Of course two or more of these compounds can be used together.

Although the quantity of the polyisocyanates, polyisothiocyanates and prepolymers thereof is not limited, from 1/300 to 1/5 parts by weight per part by weight of the hydrophobic oil solution are most preferable.

An effect of the present invention is shown in the following table in which an addition product of tolylenediisocyanate and trimethylolpropane is used. An example of gelatin-gum arabic complex coacervation is compared with the process for encapsulating described in U.S. Pat. No. 2,800,457 in which dilution with water and control of the pH are combined.

6 parts by weight of gelatin and 6 parts by weight of gum arabic were used as the hydrophilic colloid. 2 parts by weight of an addition product of tolylenediisocyanate and trimethylolpropane are added to 30 parts by weight of chlorinated diphenyl to make a hydrophobic oil solution. Encapsulation was carried out using 230 parts by weight of coacervation water at a coacervation pH 4.4. The amounts deposited of (1) before the pH conversion step and (2) at the conclusion of the encapsulation after the pH conversion are compared, which are shown in the following table.

| | Process of this Invention | | Process Described in U.S. Patent No. 2,800,457 | |
| --- | --- | --- | --- | --- |
| | (Addition product of tolylenediisocyanate and trimethylolpropane: 2 parts (1/15 parts by weight of hydrophobic oil solution)) | | (No addition of addition product of tolylenediisocyanate and trimethylolpropane) | |
| | (1) Before pH Conversion Step | (2) At Conclusion of Encapsulation after Conversion of pH | (1) Before pH Conversion Step | (2) At Conclusion of Encapsulation After Conversion of pH |
| Amount of Gelatin Deposited (% by weight) | 85 | 85 | 85 | 86 |
| Amount of Gum Arabic Deposited (% by weight) | 80 | 72 | 80 | 9 |

It is clear from the results contained in the above table that the amount of gelatin deposited of (1) is not different from that of (2) in the process described in U.S. Pat. No. 2,800,457 in which the addition product of tolylenediisocyanate and trimethylolpropane is not added, but the amount of gum arabic deposited decrease greatly to become about 1/9, that is the gum arabic deposits in the amount of 80 percent in (1) but it becomes 9 percent in (2). On the contrary, in the process of the present invention in which the addition product of tolylenediisocyanate and trimethylolpropane is added, the amount of gelatin deposited in (1) and that in (2) are essentially the same and the amount of gum arabic deposited decreases slightly only from 80 percent in (1) to 72 percent in (2).

It is clear from the above results that the defects caused by the decrease in the amount of gum arabic deposited in the pH conversion step, that is, the capsule film formed is thin, the porosity increases and the enclosed matter exudes, are improved successfully by the process of the present invention.

It has been determined that a very high effect is obtained in the prevention of coloring by dipping in water. When combining microcapsules containing a color former prepared by the process of this invention with the synthetic developers for pressure-sensitive recording paper as described in our U.S. Patent Application Ser. No. 192,594/71, now abandoned, the metal salts of aromatic carboxylic acids. Herein, coloring by dipping in water means the phenomenon in which a coated surface colors when the coated surface of the color former containing microcapsule sheet is dipped in water for 5 seconds while in contact with a coated surface of a developer sheet and dried in the air.

Further, a large advantage has been found that if the microcapsules prepared by the process of the present invention are used in preparing a pressure-sensitive recording paper by applying to the same surface of the paper the color former containing-microcapsules and a developer which colors in contact with the color former, fog which is a fatal defect in the prior process is completely removed.

The defects of the encapsulating process utilizing coacervation are that capsules with a plurality of oil drops are formed and that it is necessary to harden the capsule film for a long time (for example, more than a day is necessary in the presence of a hardener). It is useful to combine the process of the present invention with a process described in U.S. Pat. application Ser. No. 848,411/69, now Patent No. 3,687,865 or 43,868/70 now abandoned, in which the above-described faults are improved. Namely, it is possible to produce not only mononuclear capsules consisting of a single droplet but polynuclear capsules consisting of a plurality of particles which can be hardened in a short time.

As a result it is possible to adjust immediately the pH to an alkaline condition even at a coacervation condition insufficient to produce mononuclear capsules by adding a "shock" preventing agent in the presence of aldehydes as the hardening agent for gelatin at the pre-hardening step.

Herein, the term "shock" means the phenomenon in which viscosity increases rapidly at a pH near the isoelectric point of gelatin in the case of carrying out pre-hardening treatment of the coacervated capsule solution containing gelatin. The term "shock preventing agent" means a solution which prevents shock.

The process of the present invention is very useful in the production of microcapsules as described above. In the following examples, the process of the present invention will be explained in greater detail but it is not intended to be limited thereby. In the examples of the present invention, heat resistance is determined using a method which comprises dissolving 2 percent by weight based on the weight of the oil of a colorless basic dye in the oil drops, applying the capsules produced to a paper, carrying out a heat resistance test in a hot air dryer box, and contacting the capsule coated surface with a surface of a clay paper. Evaluation was made by the fact whether the surface of the clay paper colors or not.

The clay paper was prepared in the following manner.

After dispersing 100 parts by weight of activated clay (produced by Mizusawa Chemical Co.) in 300 parts by weight of water containing 5 parts of a 40 percent sodium hydroxide solution using a homogenizer, 40 parts by weight of Dow Latex 636 (trade name, styrene-butadiene copolymer latex, produced by Dow Chemical Co.) were added to the dispersion. The mixture was applied to a base paper using an air knife coater at a solids content of $12g/m^2$.

As an example of the metal salts of aromatic carboxylic acids, the preparation of zinc p-tert-butyl salicylate is shown in the following.

30 parts by weight of sodium hydroxide were dissolved in 300 parts by weight of water, and 100 parts of p-tert-butyl salicylic acid were added with stirring. When the p-tert-butyl salicylic acid dissolved completely, the solution was dried by evaporation to dryness, by which sodium p-tert-butyl salicylate was produced. 0.3 gram equivalents of this sodium p-tert-butyl salicylate and 10 parts by weight of gum arabic were dissolved in 150 parts by weight of warm water at a temperature more than about 30°C, preferably at about 40°C. To this solution, a solution prepared by dissolving 0.3 gram equivalents of zinc chloride in 150 parts by weight of warm water was added with stirring. By continuing the stirring, the solution became opaque due to a precipitation of fine crystals, that is, zinc p-tert-butyl salicylate. Thus resulting coating solution was applied to a base paper of $50g/m^2$ so as to have a solid content of $3g/m^2$ using a roll coater to produce a developer sheet.

In the following examples, "all parts and percents are by weight".

EXAMPLE 1

6 parts of an acid treated gelatin having an isoelectric point of 7.8 and 6 parts of gum arabic were dissolved in 30 parts of water of 40°C, and then 0.5 parts of Turkey red oil were added as an emulsifier. An oil solution which was prepared by adding 2 parts of modified tolylenediisocyanate (trade name: NACCONATE 4040, produced by Takeda Chem. Ind. Ltd.) to 30 parts of dichlorodiphenyl containing 2 percent of Crystal Violet Lactone (CVL) was emulsified in the above-described colloid solution with vigorous stirring to prepare an o/w emulsion. Stirring was stopped when the particle size of the oil drops was 6 - 10 $\mu$. Then the above emulsion was added to 450 parts of warm water of 35°C and stirred for 5 minutes. The pH was adjusted to 4.4 by adding 50% acetic acid dropwise while stirring. The colloid deposited around the oil drops was solidified by cooling the exterior of the container while stirring. When the temperature of the solution reached 8°C, 3 parts of a 37% formalin solution were added while stirring. Then a 10% sodium hydroxide solution was added dropwise while stirring in order to adjust the pH of the solution to an alkaline condition to make the pH 10.5 over 5 minutes. The temperature of the solution was increased to 40°C over a 20 minute period by which capsules having a high heat resistance and containing dichlorodiphenyl with CVL dissolved therein were obtained.

These capsules were applied to a base paper of 40g/m² in an amount of 5g/m² to produce a coated paper. A combination of this coated paper and a clay paper was utilized as the pressure sensitive copying paper.

On comparison of the coated paper using microcapsules prepared by the present invention (I) and a coated paper using microcapsules prepared without adding the NACCONATE 4040 (II), the coloring ability in contact with the clay paper of (II) was lost completely by exposure to sunlight for 30 minutes but the coloring ability of (I) did not change on exposure for 3 hours.

When the microcapsules obtained without adding the NACCONATE 4040 were applied to the clay paper, a deep blue was observed. On the contrary, when the microcapsules obtained in this example with the NACCONATE 4040 added were applied to the clay paper, no fog was observed at all. It was found that they were very useful as microcapsules for a single sheet recording paper.

Further, when the coated surface of (II) was dipped in water for 5 seconds in contact with a coated surface of a zinc p-tert-butyl salicylate coated paper and dried in the air, the coated surface of (II) was colored deep blue. While when the coated paper of (I) was used, no color at all was observed.

EXAMPLE 2

1 part of CVL and 0.7 parts of benzoyl leuco methylene blue were dissolved in a mixture of 40 parts of diisopropylbiphenyl and 10 parts of a chlorinated n-paraffin having 14 carbon atoms (degree of chlorination: 20 percent by weight), and 1.2 parts of a prepolymer of methylenediisocyanate (trade name: MILLIONATE MR, Nippon Polyurethane Ind. Co.) were added thereto. This oil solution was added to an aqueous solution consisting of 7 parts of gum arabic and 60 parts of warm water at 40°C to prepare an oil-in-water emulsion. Then, an aqueous solution prepared by dissolving 10 parts of acid treated gelatin having an isoelectric point of 7.8 in 80 parts of warm water at 40°C was added thereto. The pH of the solution was adjusted to 4.3 by adding 50% acetic acid while stirring at a definite speed. 250 parts of warm water of 40°C were then added thereto to cause coacervation. With stirring, colloid deposited around the oil drops was solidified by cooling the exterior of the container. When the temperature of the solution was 10°C, 4 parts of 37 percent formalin solution were added, and then 40 parts of a 10 percent aqueous solution of carboxymethyl cellulose-sodium salt (hereinafter it is described as CMC solution)(degree of etherification: 0.75, viscosity of 2% aqueous solution at 25°C: 160 c.p.) were added thereto. Still, a 10% aqueous solution of caustic soda was added dropwise in order to promote the hardening effect to make the pH 10. Further, the temperature of the solution was elevated to 50°C.

The sheet obtained by applying these capsules to a base paper was utilized as the upper sheet of the pressure sensitive copying paper, which exhibited good results in the sunlight exposure test described in Example 1 and has excellent properties for a pressure sensitive copying paper which could not be obtained hitherto.

EXAMPLE 3

5 parts of a perfumed oil (trade name: Emerald Jasmine Y-1514E, produced by Ogawa Koryo K. K.) and 40 parts of diisopropylbiphenyl were mixed and 0.3 parts of a 75 percent ethyl acetate solution of triisocyanate prepared by reacting 3 mols of tolylenediisocyanate and 1 mol of trimethylolpropane (trade name: COLONATE L, produced by Nippon Polyurethane Ind. Co.) were added thereto. The resulting hydrophobic oil solution was added to an aqueous solution consisting of 10 parts of gum arabic and 60 parts of warm water at 40°C to produce an oil-in-water emulsion having a drop size of 20–25 $\mu$. An aqueous solution prepared by dissolving 10 parts of acid treated gelatin having an isoelectric point of 8.0 in 80 parts of warm water at 40°C was added to the emulsion. The pH of the emulsion was adjusted to 4.5 by adding 50 percent acetic acid with stirring at a definite speed. Then, the emulsion was added to 250 parts of warm water at 40°C to cause coacervation. The colloid deposited around the oil drops was solidified by cooling the exterior of the container while stirring. When the temperature of the solution became 10°C, a 37% formalin solution was added and then 40 parts of a 10 percent CMC solution were added thereto. In order to promote the hardening effect, a 10 percent aqueous solution of sodium hydroxide was added dropwise to adjust the pH to 10. Further, the temperature of the solution was increased to 50°C.

The resulting perfume oil containing capsules were applied to a base paper. When breaking the capsules after being allowed to stand for 5 months at a room temperature, the odor did not change at all due to the lapse of time, which demonstrated that the perfume oil did not exude.

On the other hand, perfume oil containing capsules prepared without adding the COLONATE L were applied to a base paper. When the coated paper was allowed to stand at room temperature for a month, almost all of the perfume disappeared which meant the perfume oil had exuded.

EXAMPLE 4

6 parts of acid treated gelatin having an isoelectric point of 7.9 and 6 parts of gum arabic were dissolved in 30 parts of water at 40°C, and then 0.5 parts of Turkey red oil were added as an emulsifier.

An oil solution prepared by adding 0.4 parts of tolylenediisocyanate (trade name: Desmodur T, produced by Bayer A. G.) to 30 parts of benzene was added to the above described colloid solution while stirring vigorously to produce an o/w emulsion. The stirring was stopped when the oil drop size became 15 μ. Then the above described emulsion was added to 415 parts of warm water at 35°C and stirred for 5 minutes. The pH was adjusted to 4.5 by adding 50 percent acetic acid dropwise with stirring. Then the colloid deposited around the oil drops was solidified by cooling the exterior of the container while stirring. When the temperature of the solution became 8°C, 3 parts of a 37% formalin solution was added while stirring. A 10% aqueous solution of sodium hydroxide was added dropwise while stirring in order to adjust the pH of the solution to alkalinity, by which the pH was adjusted to 10 after 5 minutes. Further, the capsule solution was warmed to 50°C to produce benzene containing capsules.

The capsules were separated from water. When the capsules were allowed to stand for 4 months at 70°C in an atmosphere of 55 percent relative humidity, the benzene enclosed in the capsules was protected in a stable manner and without evaporation.

On the other hand, capsules prepared without adding the Desmodur T were separated from water in a similar manner. When the capsules were allowed to stand at 70°C in an atmosphere of 55 percent relative humidity, all of the benzene evaporated within a week.

EXAMPLE 5

6 parts of an acid modified gelatin having an isoelectric point of 7.5 and 4 parts of gum arabic were dissolved in 30 parts of water at 40°C, and 0.5 parts of Turkey red oil were added thereto as an emulsifier. An oil solution produced by adding 3.2 parts of an addition product of hexamethylenediisocyanate and trimethylolpropane (trade name: COLONATE HL, produced by Nippon Polyurethane Ind. Co.) to a mixture of 25 parts of 2,4-dimethyldiphenylmethane containing 2% of CVL and 5 parts of dibutyl phthalate was added to the above described colloid solution with vigorous stirring to produce an o/w emulsion. The stirring was stopped when the oil drop size became 6 - 10 μ. Then, the emulsion was added to 165 parts of water at 35°C, and stirred for 5 minutes. The pH was adjusted to 4.25 by adding 50 percent acetic acid dropwise while stirring. The colloid deposited around the oil drops was solidified by cooling the exterior of the container while stirring. When the temperature of the solution became 8°C, 3 parts of a 37 percent formalin solution were added while stirring. After adding 30 parts of a 5 percent carboxymethyl cellulose solution and dispersing for 3 minutes, a 10 percent aqueous solution of sodium hydroxide was added dropwise while stirring in order to adjust the pH of the solution to an alkaline condition to adjust the pH to 10 within 5 minutes. The temperature of the solution was increased to 40° C over a 20 minute period, by which capsules having high heat resistance were obtained.

A combination of a coated paper produced by applying the above capsules to a paper of 40g/m² so as to have a solid's level of 4.5g/m² and a clay paper was utilized as the pressure sensitive copying paper.

When a clay solution was applied to a surface of a microcapsule coated paper prepared without adding the HL, it fogged a deep blue. However, no fogging at all was observed when the clay solution was applied to a surface of the microcapsule coated paper prepared by this example of the invention. It was understood that this was very effective as the microcapsules for single sheet type of recording paper.

Furthermore, when the coated surface of the microcapsule coated paper prepared by this example was dipped in water for 5 seconds while in contact with a coated surface of a zinc p-tert-butyl salicylate coated paper and dried in the air thereafter, coloring did not result, by which it was understood that there was a large coloring preventing effect on dipping in water.

While the invention has been described in detail and with reference to specific embodiments thereof it will be apparent that various changes and modifications can be made therein without departing from the spirit and scope thereof.

What is claimed is:

1. A process for producing microcapsules of a hydrophobic oil solution comprising the sequential steps of adding at least one polyisocyanate compound, polyisothiocyanate compound, or a prepolymer thereof, to said hydrophobic oil solution in an amount sufficient to provide microcapsule walls with low porosity; preparing an emulsion of said hydrophobic oil solution in a coacervate dispersion comprising at least two hydrophilic high molecular weight compound colloids having opposite electrical charges from each other; then causing complex coacervation to form coacervate walls of said at least two colloids around droplets of said hydrophobic oil solution by adding water thereto, adjusting the pH thereof or by a combination of adding water and adjusting the pH; cooling to cause gelling of the coacervate walls and hardening said coacervate walls by a combination of adding a hardening agent to the system and adjusting the pH of the system to an alkaline condition.

2. The process for producing microcapsules of claim 1, wherein the combination of said colloids is selected from members of the group consisting of gelatin, casein, albumin, alginate, fibrinogen, gum arabic, carboxymethyl cellulose, cellulose phthalate, styrene-maleic anhydride copolymer, methyl vinyl ether-maleic anhydride copolymer, and carrageenan. anhydride copolymer, carrageenan.

3. The process for producing microcapsules of claim 2, wherein one of said colloids is gelatin.

4. The process for producing microcapsules of claim 1, wherein said hydrophobic oil is a mineral oil, an animal oil, synthetic oil, or a vegetable oil.

5. The process for producing microcapsules of claim 4, wherein said mineral oil is petroleum or distillates thereof, wherein said vegetable oil is peanut oil, linseed oil, soybean oil, castor oil or corn oil, wherein said animal oil is fish oil, or lard oil, and wherein said synthetic oil is a biphenyl derivative, a phosphoric acid derivative, a naphthalene derivative, a phthalic acid derivative, or a salicylic acid derivative.

6. The process for producing microcapsules of claim 5, wherein said mineral oil is kerosene, gasoline, naphtha, or paraffin oil.

7. The process for producing microcapsules of claim 1, wherein said hydrophobic oil solution contains additionally an anionic, a cationic, or a nonionic surface active agent.

8. The process for producing microcapsules of claim 1, wherein said polyisocyanates or polyisothiocyanates are diisocyanates, diisothiocyanates, triisocyanates, or triisothiocyanates.

9. The process for producing microcapsules of claim 1, wherein said polyisocyanate, said polyisothiocyanate, or said prepolymer thereof is m-phenylene diisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-dimethoxy-4,4'-biphenyldiisocyanate, 3,3'-dimethyldiphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate propylene-1,2-diisocyanate, butylene-1,2-diisocyanate, ethylidynediisocyanate, cyclohexylene-1,2-diisocyanate, cyclohexylene-1,4-diisocyanate, p-phenylenediisothiocyanate, xylylene-1,4-diisothiocyanate, ethylidynediisocyanate, 4,4',4''-triphenylmethanetriisocyanate, toluene-2,4,6-triisocyanate, polymethylenepolyphenyl-triisocyanate, 4,4'-dimethyldiphenylmethane-2,2',5,5'-tetraisocyanate, the addition product of hexamethylenediisocyanate and hexanetriol, the addition product of 2,4-tolylenediisocyanate and catechol, the addition product of tolylenediisocyanate and hexanetriol, the addition product of tolylenediisocyanate and trimethylolpropane, the addition product of xylylenediisocyanate and trimethylolpropane, or the addition product of hexamethylenediisocyanate and trimethylolpropane.

10. The process for producing microcapsules of claim 1, wherein said polyisocyanate compound, polyisothiocyanate compound, or prepolymer thereof is present in an amount ranging from about 1/300 to 1/5 parts by weight for each part by weight of said hydrophobic oil solution.

11. The process for producing microcapsules of claim 1, wherein a shock preventing agent selected from the group consisting of modified cellulose, an anionic starch derivative, an anionic acid polysaccaride, a condensate of naphthalene sulfonic acid and formalin, a hydroxyethyl cellulose derivative, a copolymer of vinylbenzene sulfonate and a copolymer of sodium acrylate is added to the system after said gelation and prior to hardening.

12. The process for producing microcapsules of claim 11, wherein said shock preventing agent comprises carboxymethyl cellulose or carboxymethyl starch.

* * * * *